(12) United States Patent
Ohtsuka

(10) Patent No.: US 10,104,291 B2
(45) Date of Patent: Oct. 16, 2018

(54) IMAGING DEVICE

(71) Applicant: Panasonic Intellectual Property Management Co., Ltd., Osaka (JP)

(72) Inventor: Yoshio Ohtsuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/704,372

(22) Filed: Sep. 14, 2017

(65) Prior Publication Data

US 2018/0007267 A1    Jan. 4, 2018

Related U.S. Application Data

(63) Continuation of application No. PCT/JP2016/000102, filed on Jan. 12, 2016.

(30) Foreign Application Priority Data

Mar. 27, 2015 (JP) ................. 2015-065874

(51) Int. Cl.
| | |
|---|---|
| *H04N 5/232* | (2006.01) |
| *H04R 3/00* | (2006.01) |
| *G02B 7/09* | (2006.01) |
| *G10L 21/0232* | (2013.01) |

(52) U.S. Cl.
CPC ........... *H04N 5/23245* (2013.01); *G02B 7/09* (2013.01); *G10L 21/0232* (2013.01); *H04R 3/00* (2013.01); *H04R 3/005* (2013.01)

(58) Field of Classification Search
CPC ....................... H04N 5/23245; G10L 21/0232; G10K 11/34; H04R 1/40; H04R 3/00; H04R 3/005; H04R 5/027; H04R 11/04; H04R 17/02; H04R 21/02; H04R 19/04; H04R 25/40–25/407
See application file for complete search history.

(56) References Cited

U.S. PATENT DOCUMENTS

| | | | | |
|---|---|---|---|---|
| 7,817,805 | B1* | 10/2010 | Griffin | .................... G01S 3/807 367/103 |
| 2009/0208028 | A1* | 8/2009 | Andrea | .................. H04R 3/005 381/71.11 |
| 2012/0099830 | A1* | 4/2012 | Shibuno | ............. H04N 5/23209 386/224 |

FOREIGN PATENT DOCUMENTS

JP          2012-178785        9/2012

OTHER PUBLICATIONS

The Extended European Search Report dated Mar. 19, 2018 for the related European Patent Application No. 16771565.5.

* cited by examiner

*Primary Examiner* — Lin Ye
*Assistant Examiner* — Chriss Yoder, III
(74) *Attorney, Agent, or Firm* — Renner Otto Boisselle & Sklar, LLP

(57) ABSTRACT

An imaging device includes an optical system including a movable lens, an image capture unit configured to capture a subject image through the optical system, a sound-collecting microphone, and a control unit configured to control the optical system and the image capture unit and to receive an sound signal from the microphone. The imaging device has a first mode and a second mode as moving-image shooting modes. The control unit makes the movable lens move faster in the first mode than in the second mode when a moving image is captured. The control unit filters the sound signal with a narrower-band filter in the first mode than in the second mode.

3 Claims, 7 Drawing Sheets

IMAGING DEVICE

BACKGROUND

1. Technical Field

The present disclosure relates to an imaging device.

2. Description of Related Art

Japanese Unexamined Patent Application Publication No. 2012-178785 discloses a signal processing device equipped with a processing unit which functions as follows. When an imaging device captures an image, the processing unit applies noise reduction to an sound signal differently depending on whether the signal is associated with a moving image or a still image. The noise reduction is controlled so that the original sound represented by the signal remains unchanged when the sound signal is associated with a still image, and that the sound becomes more audible when the sound signal is associated with a moving image.

SUMMARY

An imaging device according to the present disclosure reduces operating noise when a moving image is captured under photographic conditions in which an image can be extracted from the moving image and used as a still image. The sound signal of the moving image being captured under such photographic conditions may contain the operating noise of components (e.g., lenses) of the imaging device. The imaging device according to the present disclosure reduces the operating noise.

The imaging device according to the present disclosure includes an optical system including a movable lens, an image capture unit configured to capture a subject image through the optical system, a sound-collecting microphone, and a control unit configured to control the optical system and the image capture unit and to receive an sound signal from the microphone. The imaging device has a first mode and a second mode as moving-image shooting modes. The control unit makes the movable lens move faster in the first mode than in the second mode when a moving image is captured. The control unit filters the sound signal with a narrower-band filter in the first mode than in the second mode.

The imaging device according to the present disclosure can reduce the operating noise of components of the imaging device that may be contained in the sound signal of a moving image, even under photographic conditions in which an image is extracted from a moving image and used as a still image.

DETAILED DESCRIPTION

Figure 1:
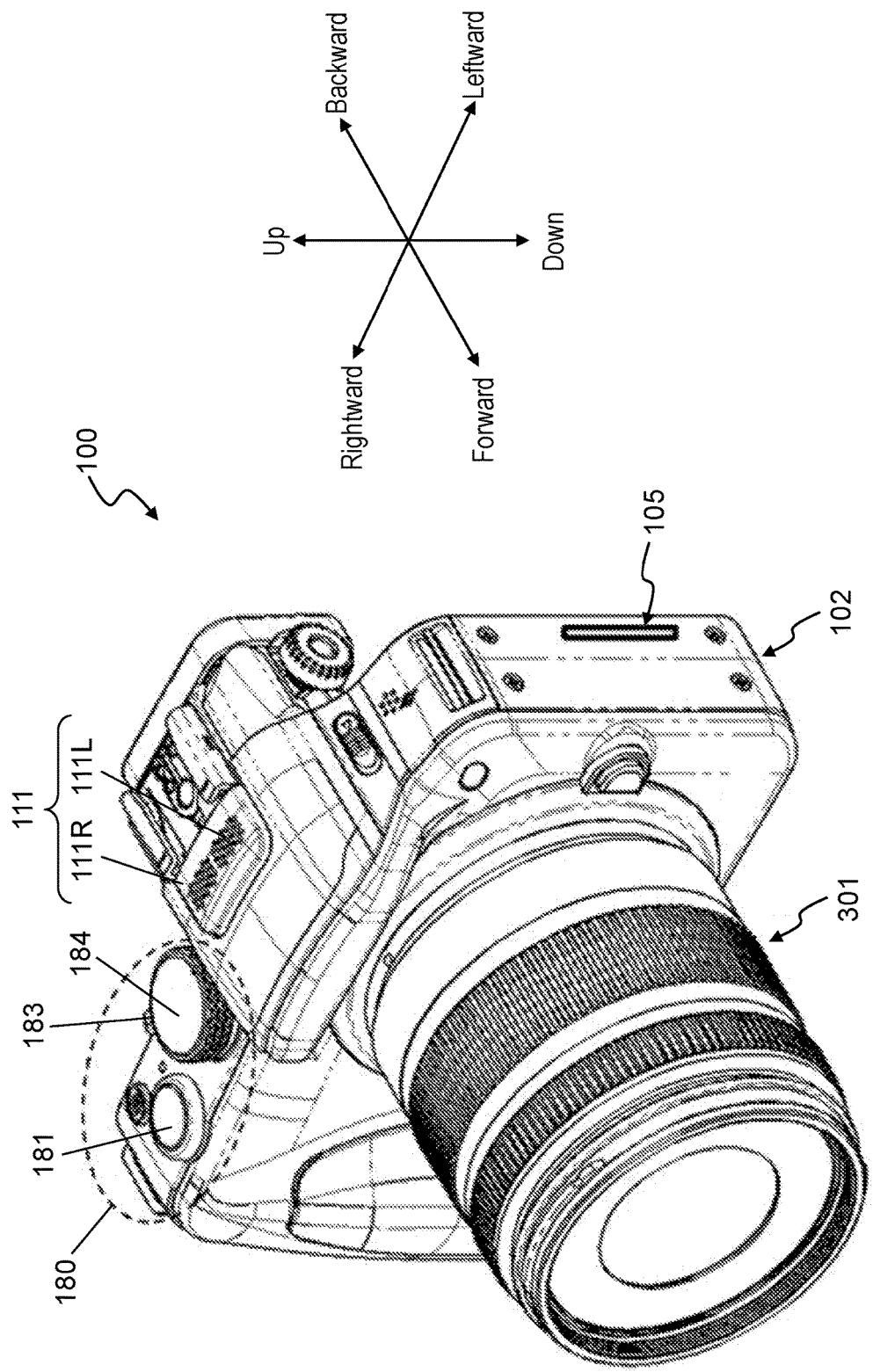
FIG. 1 is a front perspective view of a digital camera according to a first exemplary embodiment.

Exemplary embodiments will be described in detail as follows with reference to the accompanying drawings. In the exemplary embodiments, the description of well-known matter and of substantially the same configuration as described earlier may be omitted to avoid redundancy and help those skilled in the art understand them easily.

Note that the attached drawings and the following description are provided to make those skilled in the art fully understand the present disclosure, and are not intended to limit the claimed subject matter.

First Exemplary Embodiment

A first exemplary embodiment of the present disclosure will now be described with reference to the drawings. In these drawings, the same or similar components are denoted by the same or similar reference numerals. The drawings are only schematic and the dimensional ratios are not the same as the actual ones. Therefore, actual dimensions should be determined by considering the following description. It goes without saying that the dimensional relations and ratios of some components may be different between these drawings.

In the following exemplary embodiment, a digital camera is taken as an example of the imaging device. In the following description, when the imaging device is held in normal position (hereinafter also referred to as horizontal position), directions are expressed as follows: toward a subject as "forward"; opposite to the subject as "backward"; the vertically upward as "up"; the vertically downward as "down"; the rightward when the device faces the subject as "rightward"; and the leftward when device faces the subject as "leftward".

FIG. 1 is a front perspective view of digital camera 100 of the first exemplary embodiment. Digital camera 100 includes microphone unit 111, which records sound while a moving image is being captured. The structure and operation of digital camera 100 will be described as follows.

1. Structure

The structure of digital camera 100 will now be described with reference to the drawings.

As shown in FIG. 1, digital camera 100 includes digital camera body 102 and interchangeable lens 301. Digital camera 100 further includes, on its top surface, operation unit 180 including release button 181, power switch 183, and mode dial 184.

Microphone unit 111 mounted on the top surface of digital camera 100 includes microphone 111L and microphone 111R arranged side by side. Digital camera 100 further includes, on its side surface, HDMI (registered trademark) output terminal 105.

Figure 2:
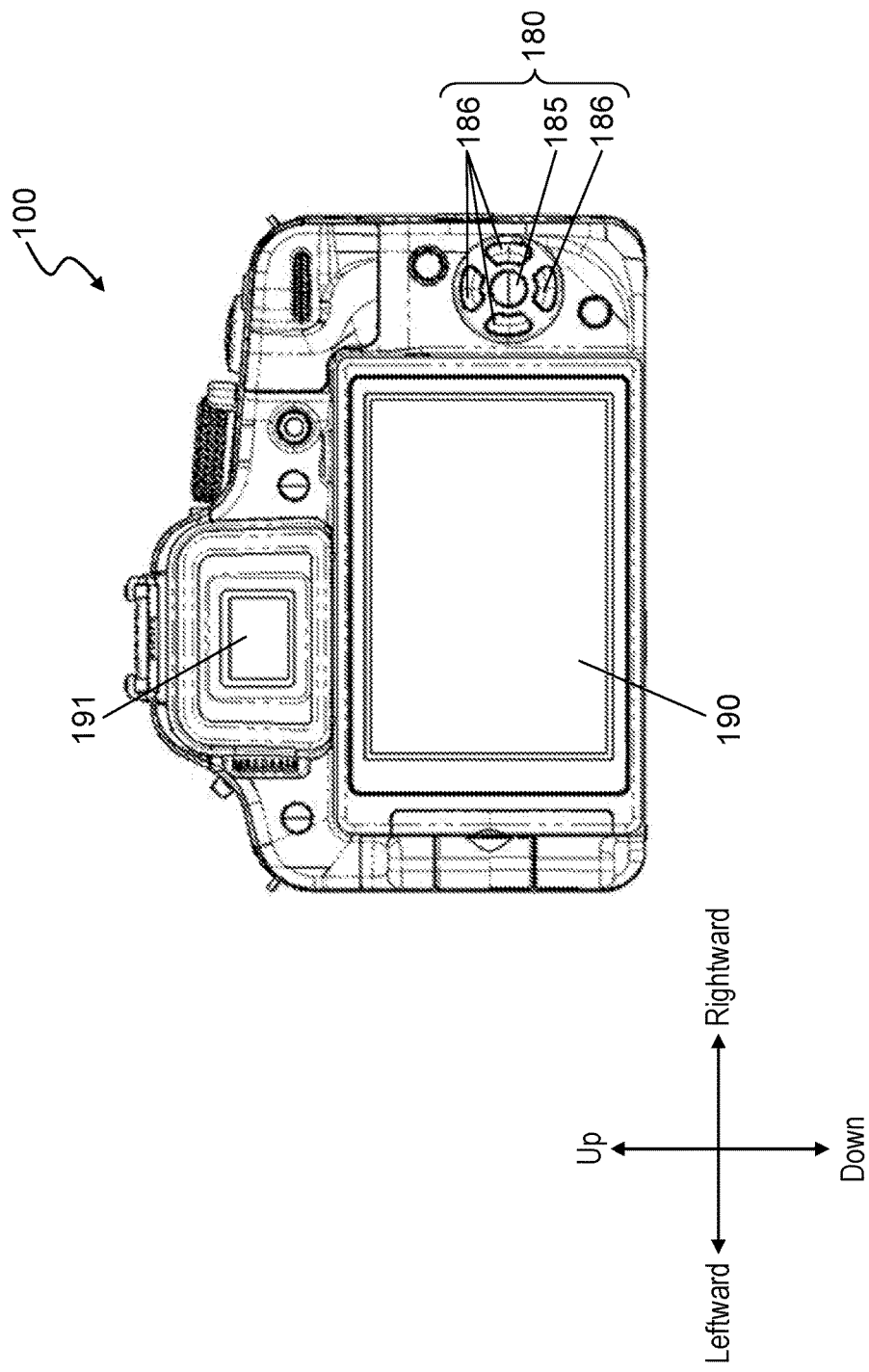
FIG. 2 is a rear view of the digital camera according to the first exemplary embodiment.

FIG. 2 is a rear view of digital camera 100. On its rear side, digital camera 100 includes center button 185 and cross button 186, both belonging to operation unit 180, and also includes display unit 190 and view finder 191.

Figure 3:
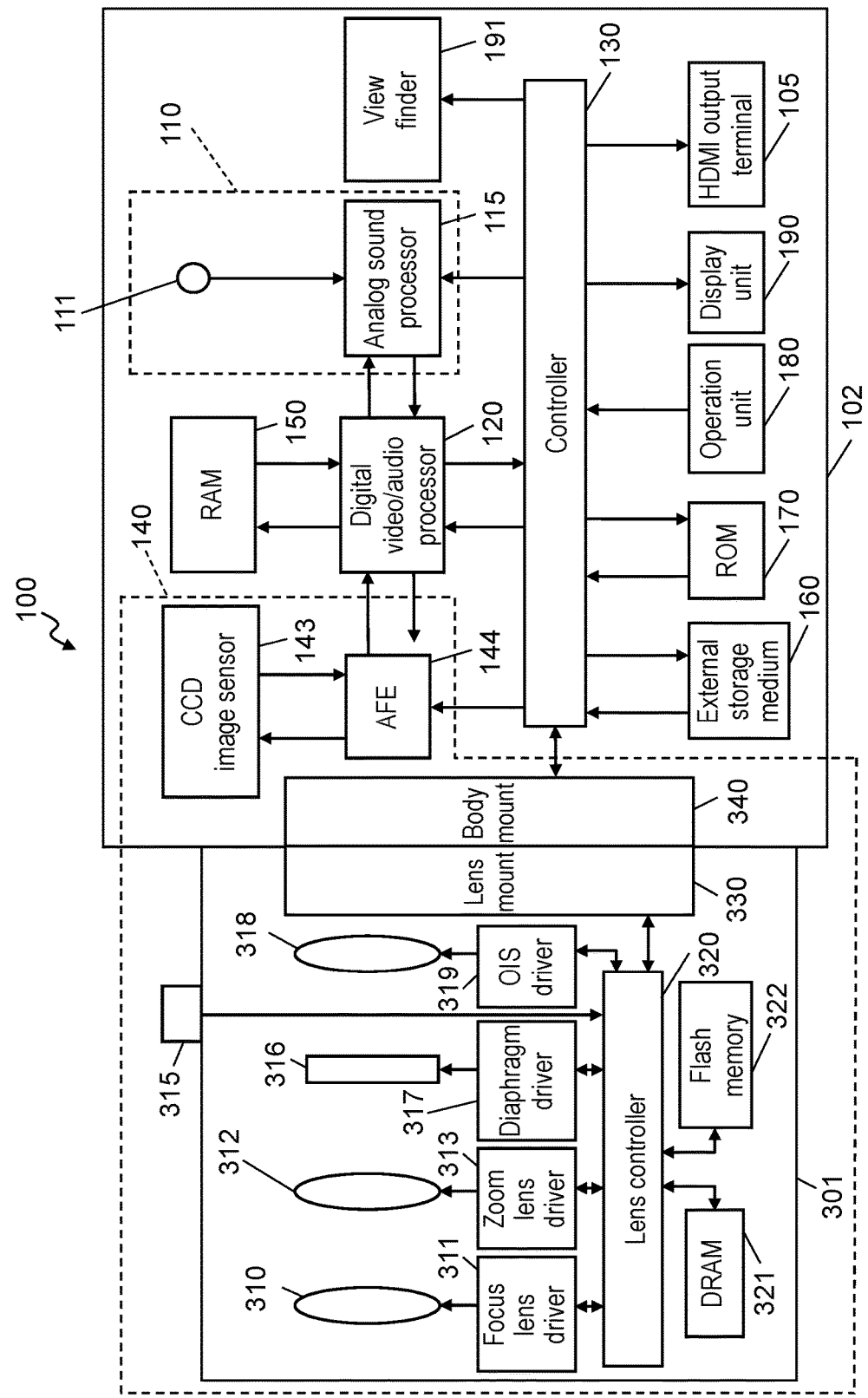
FIG. 3 is a block diagram showing the electrical structure of the digital camera according to the first exemplary embodiment.

FIG. 3 is an electrical structure diagram of digital camera 100. Digital camera 100 includes digital camera body 102 and interchangeable lens 301. Body 102 includes CCD image sensor 143, analog front end (AFE) 144, sound input system 110, digital video/audio processor 120, controller 130, RAM 150, external storage medium 160, ROM 170, operation unit 180, display unit 190, view finder 191, body mount 340, and HDMI output terminal 105.

Digital camera 100 generates image information and sound signals from external information. Image information is generated by image input system 140, whereas sound signals are generated by sound input system 110. Generated image information and sound signals are AD-converted and processed by digital video/audio processor 120. The processed image information and sound signals are stored in external storage medium 160 such as a memory card and/or outputted through HDMI output terminal 105. The image information stored in external storage medium 160 is displayed on display unit 190 and/or view finder 191 in response to the user's operation of operation unit 180. The image information and sound signals stored in external storage medium 160 are also outputted through HDMI output terminal 105.

Each component shown in FIGS. 1 to 3 will now be described in detail.

Image input system 140 includes interchangeable lens 301, CCD image sensor 143, and AFE 144. CCD image sensor 143 and AFE 144 belong to digital camera body 102.

Interchangeable lens 301 includes an optical system including a plurality of lenses. More specifically, interchangeable lens 301 includes lens controller 320, lens mount 330, focus lens 310, OIS lens 318, and zoom lens 312, all of which are components of the optical system. Interchangeable lens 301 further includes focus lens driver 311, zoom lens driver 313, diaphragm 316, diaphragm driver 317, operation ring 315, OIS controller 319, DRAM 321, and flash memory 322.

Lens controller 320 controls interchangeable lens 301 as a whole. Under the control of lens controller 320, zoom lens driver 313 drives zoom lens 312, focus lens driver 311 drives focus lens 310, OIS controller 319 drives OIS lens 318, and diaphragm driver 317 drives diaphragm 316 in response to the user's operation of operation ring 315.

When driven fast, focus lens 310, zoom lens 312, OIS lens 318, and diaphragm 316 (hereinafter, referred to as "each lens and diaphragm") are accompanied by loud noise and vibration, while when driven slowly, the noise and vibration are low.

Lens controller 320 is coupled with DRAM 321 and flash memory 322 so as to read and write information when necessary. Lens controller 320 can communicate with controller 130 through lens mount 330. Controller 130 may be a hard-wired electronic circuit or a microcontroller with programs.

Lens mount 330 is a member for coupling interchangeable lens 301 with digital camera body 102 mechanically and electrically in cooperation with body mount 340 of digital camera body 102. When interchangeable lens 301 and digital camera body 102 are thus coupled to each other, lens controller 320 can communicate with controller 130.

DRAM 321 is used as a working memory when lens controller 320 performs various controls. Flash memory 322 contains, for example, programs, parameters, and lens data, all of which are used for various controls implemented by lens controller 320.

Focus lens 310 change the focus of a subject image that is incident on the optical system of interchangeable lens 301 and is then generated on CCD image sensor 143. It would be possible to use a plurality of focus lenses 310 or a plurality of groups of focus lenses 310. Focus lens driver 311 drives focus lens 310 and makes it move forward and backward along the axis of the optical system based on a control signal from lens controller 320. Focus lens driver 311 can be, for example, a stepping motor, a DC motor, or an ultrasonic motor.

Zoom lens 312 changes the magnification of a subject image generated in the optical system of interchangeable lens 301. It would be possible to use a plurality of zoom lenses 312 or a plurality of groups of zoom lenses 312. Zoom lens driver 313 drives zoom lens 312 and makes it move forward and backward along the axis of the optical system based on a control signal from lens controller 320. Zoom lens driver 313 can be, for example, a stepping motor, a DC motor, or an ultrasonic motor. OIS lens 318 corrects blurring of a subject image generated by the optical system of interchangeable lens 301, and more specifically, corrects blurring of a subject image caused by blurring of digital camera 100. Moving OIS lens 318 in the direction of compensating the blurring of digital camera 100 reduces the relative blurring between CCD image sensor 143 and the subject image, and more specifically, reduces the blurring of the subject image on CCD image sensor 143. It is possible to use one or a plurality of OIS lenses 318. OIS controller 319 drives OIS lens 318 within a plane perpendicular to the axis of the optical system.

Diaphragm 316 is composed of a plurality of openable mechanical blades. Diaphragm 316 is a member for controlling the amount of light incident on the optical system of interchangeable lens 301. Diaphragm driver 317 drives diaphragm 316 to change the degree of opening of the mechanical blades based on a control signal from lens controller 320. Diaphragm driver 317 can be, for example, a stepping motor, a DC motor, or an ultrasonic motor.

Operation ring 315 is an operation member located on the outer surface of interchangeable lens 301, and rotates with respect to interchangeable lens 301. The angle and speed of rotation of operation ring 315 are detected by an unillustrated detector and reported to lens controller 320. Lens controller 320 provides the driver for zoom lens 312 with a drive control signal based on the reported angle and speed of rotation of the operation ring 315. Lens controller 320 provides zoom lens driver 313 with the drive control signal so that zoom lens 312 is driven in response to the user's operation of operation ring 315.

Body mount 340 is a member for coupling interchangeable lens 301 with digital camera body 102 mechanically and electrically in cooperation with lens mount 330 of interchangeable lens 301. When interchangeable lens 301 and digital camera body 102 are thus coupled to each other, lens controller 320 can communicate with controller 130. Body mount 340 informs lens controller 320, via lens mount 330, of an exposure synchronizing signal and other control signals received from controller 130. Body mount 340 further informs controller 130 of a signal received from lens controller 320 via lens mount 330.

CCD image sensor 143 captures a subject image generated by interchangeable lens 301 and generates image information. CCD image sensor 143 has, on its light-receiving surface, a large number of photodiodes arranged two dimensionally (in a matrix). Primary color filters of red (R), green (G) and blue (B), each corresponding to the photodiode, are arranged in a predetermined pattern. Light from a subject as the target to be captured passes through interchangeable lens 301, and is then formed into an image on the light-receiving surface of CCD image sensor 143. The produced subject image is converted into color information (RGB) in accordance with the amount of light incident on each photodiode. This results in the generation of image information showing the entire subject image. Each photodiode corresponds to one of the pixels of CCD image sensor 143; however, the color information actually obtained from each photodiode is primary color information of any one of RGB. Therefore, the color of each pixel is generated in digital video/audio processor 120 located at a later stage, based on primary color information (the color and the amount of light) obtained from the photodiode corresponding to each pixel and its neighboring photodiodes. CCD image sensor 143 can generate image information of a frame, which is renewed at a predetermined time interval when digital camera 100 is in shooting mode.

AFE 144 reads the image information from CCD image sensor 143, and processes the information as follows: reducing noise in the information using correlated double sampling; amplifying the information to fit the input range of the AD converter using its analog gain controller; and AD-converting the information using its AD converter. AFE 144 then sends the processed image information to digital video/audio processor 120.

Sound input system 110 includes microphone unit 111 and analog sound processor 115. Microphone unit 111 includes microphones 111L and 111R. Microphone unit 111 converts acoustic signals into electrical signals in these microphones and sends them to analog sound processor 115. Analog sound processor 115 processes the sound signals and makes AD converter AD-convert the signals and sends them to digital video/audio processor 120.

Digital video/audio processor 120 applies various processes to the image information received from AFE 144 and to the sound signals received from analog sound processor 115. For example, the image information is subjected to gamma correction, white balance correction, blemish correction, and encoding based on the instructions from controller 130. Also, the sound signals are subjected to various processes based on the instructions from controller 130. Digital video/audio processor 120 can be, for example, a hard-wired electronic circuit or a microcontroller executing programs. Alternatively, processor 120 can be formed in a single semiconductor chip together with controller 130.

Digital video/audio processor 120 performs arithmetic operations to apply filtering or directivity synthesis to the sound signals, which are the outputs of microphone unit 111. Filtering and directivity synthesis applied to the sound signals will be described in detailed later.

Display unit 190 is located on the rear side of digital camera 100. In the present exemplary embodiment, display unit 190 is a liquid crystal display. Display unit 190 displays images based on the image information processed by digital video/audio processor 120. Examples of the image to be displayed on display unit 190 include a through-the-lens image, a reproduced image, a control selection screen, a warning screen, and a power-off screen. The through-the-lens image is an image in a frame that is renewed at a predetermined time interval by CCD image sensor 143. Digital video/audio processor 120 generates a through-the-lens image from the image information generated by CCD image sensor 143 usually when digital camera 100 is in shooting mode and either is in a standby state ready to take a still image, or is taking a moving image. The user can capture a subject while looking at the through-the-lens image on display unit 190 to observe the composition of the subject. A reproduced image is generated by digital video/audio processor 120 when digital camera 100 is in playback mode. A reproduced image is generated by reducing a high-resolution image stored in, for example, external storage medium 160 to fit the size of display unit 190. The high-resolution image information stored in external storage medium 160 is generated by digital video/audio processor 120 based on the image information generated by CCD image sensor 143 in response to the user's operation of release button 181. Examples of the control selection screen include a menu screen from which the user selects an item, and a lens control selection screen, which is displayed when HDMI output terminal 105 is coupled with an external device. The menu screen is displayed, for example, when the user operates operation unit 180 while the through-the-lens image is being displayed. The lens control selection screen will be described in detail later. The shooting mode means that either a still image or a moving image is being captured. The mode in which the display unit is displaying a through-the-lens image while neither a still image nor a moving image is being captured is referred to as live mode. The mode in which display unit 190 is displaying a reproduced image is referred to as playback mode. The mode in which display unit 190 is displaying the menu screen is referred to as menu mode. The display shown on display unit 190 can alternatively be shown on view finder 191.

Controller 130 controls the entire operation of digital camera 100.

ROM 170 stores programs for auto-focus (AF) control, auto-exposure (AE) control, and strobe-emission control each of which is to be executed by controller 130, and other programs to control the entire operation of digital camera 100. ROM 170 further stores various conditions and settings on digital camera 100. ROM 170 in the present exemplary embodiment is a flash ROM.

Controller 130 can be, for example, a hard-wired electronic circuit, or a microcontroller executing programs. Alternatively, controller 130 can be formed in a single semiconductor chip together with digital video/audio processor 120. ROM 170 may be integrated into controller 130 instead of being a separate component from controller 130.

RAM 150 functions as a working memory of digital video/audio processor 120 and controller 130. RAM 150 can be, for example, a SDRAM or a flash memory. RAM 150 also functions as an internal memory to store image information and sound signals.

External storage medium 160 is an external memory including a nonvolatile memory unit such as a flash memory. External storage medium 160 can store data such as image information and sound signals to be processed by digital video/audio processor 120.

Operation unit 180 is a collective term of operational interfaces such as operation buttons and operation dials located on the outer part of digital camera 100. Operation unit 180, which is operated by the user, includes release button 181, power switch 183, mode dial 184, center button 185, and cross button 186 shown in FIGS. 1, 2, and 3. Operation unit 180 sends signals to initiate various operations to controller 130 in response to the user's operation.

Release button 181 can be pushed halfway or all the way down. When the user pushes release button 181 halfway down, controller 130 performs AF control and/or AE control to determine photographic conditions. In AF control, digital video/audio processor 120 calculates the contrast value in a predetermined area of the image information, and controller 130 drives interchangeable lens 301 based on the contrast value and performs feedback control to maximize the contrast value. As a result of AF control, controller 130 can determine the focal length, which is the distance to the subject as the target of AF control, whereas interchangeable lens 301 can produce the subject image as the target of AF control on CCD image sensor 143. If the user subsequently pushes release button 181 all the way down, controller 130 performs control so that the image information captured at the timing at which button 181 is pushed all the way down is stored into external storage medium 160.

Power switch 183 is a slide switch to turn on/off the power supply to each component of digital camera 100. If the user slides power switch 183 rightward when the power is OFF, controller 130 supplies power to each component of digital camera 100 to activate them. If the user slides power switch 183 leftward when the power is ON, controller 130 stops the power supply to each component of digital camera 100.

Mode dial 184 is a rotary dial. If the user rotates mode dial 184, controller 130 switches the mode of operation of digital camera 100 to the mode indicated by the current position of mode dial 184. Examples of the mode of operation include automatic shooting mode, manual shooting mode, and scene selection mode, which are collectively referred to as shooting mode.

Center button 185 is a push button. If the user pushes center button 185 when digital camera 100 is either in shooting mode or in playback mode, controller 130 makes display unit 190 display the menu screen. The menu screen shows various photographic and playback conditions to be set by the user. If the user pushes center button 185 when a value of a condition setting item is selected on the menu screen, the setting item is set to the value. The determined setting value is stored in ROM 170.

Cross button 186 consists of four push buttons: up, down, right, and left. The user can push any push button of cross button 186 to choose the value of a condition setting item shown on the menu screen.

2. Lens Control and Shooting Mode

In the case of capturing a still image, it is preferable that each lens and diaphragm should be driven fast to quickly follow the target value and not to miss the chance for a good photograph. The suitable mode for the lens control of a still image is hereinafter referred to as "still-image priority mode". Under circumstances where the target to be captured or the user is moving, or brightness changes, if the control of each lens and diaphragm is started after the user pushes release button 181, the chance for a good photograph may be missed no matter how fast the control. To avoid this happening, under such circumstances, it is preferable that the control of each lens and diaphragm should always be started before release button 181 is pushed. The quick control of each lens and diaphragm is included in the still-image priority mode.

In the case of capturing a moving image, driving each lens and diaphragm fast may cause the image to be unnatural and strange. Moreover, vibration and noise caused while each lens and diaphragm are driven fast may be recorded loud. To avoid this happening, in the case of capturing a moving image, it is preferable that each lens and diaphragm should be driven slowly to take time to follow the target value. The suitable mode for the lens control of a moving image is hereinafter referred to as "moving-image priority mode". Each lens and diaphragm are driven slower in the moving-image priority mode than in the still-image priority mode.

It is known to clip a still image from a moving-image file. For example, a moving image with a resolution of 4 K and a frame rate of 30 p is expressed by capturing 30 images each with 3840×2160 pixels in one second and continuously playing them back. One of these moving images can be clipped and used as a still image. If the original moving image file is captured in the moving-image priority mode, each lens and diaphragm are controlled slowly as described above. As a result, even if the original image file is of high quality, a still image clipped from it may not be of high quality. A moving image can be captured in the still-image priority mode in order to improve the quality of a still image clipped from the moving image file, although it decreases the quality of the moving image. This mode is hereinafter referred to as "still-image priority moving-image mode". When capturing a moving image, the user can operate operation unit 180 to select the still-image priority moving-image mode. A moving image file captured in this mode can be played back and viewed in the same manner as an ordinary moving image. In this mode, however, images may be unnatural and strange because the lenses are controlled in the still-image priority mode as described above. Moreover, in the still-image priority moving-image mode, each lens and diaphragm are driven fast and cause heavy vibration and noise. More specifically, noise caused during the driving of the lenses may be louder and sound quality of captured moving-image data may be lower in the still-image priority moving-image mode than in the moving-image priority mode. When a moving image is captured in the moving-image priority mode, this is hereinafter referred to as "moving-image mode".

3. Operation

The operation of digital camera 100 according to the present exemplary embodiment will now be described in brief.

Digital video/audio processor 120 applies filtering to sound signals from microphone unit 111 by arithmetic operations. It is known that it is preferable to use a filter with an approximately flat frequency response because it produces sound signals true to the original sound and of high quality. Therefore, when the user operates operation unit 180 to select the moving-image mode in order to capture a moving image, it is preferable that the filtering applied to sound signals by digital video/audio processor 120 should have an approximately flat frequency response. Meanwhile, it has been known to use a band-limiting filter in order to reduce noise of sound signals. When the user operates operation unit 180 to select the still-image priority moving-image mode and capture a moving image, each lens and diaphragm are driven fast because the lenses are controlled in the still-image priority mode as described above. Vibration and noise caused during the driving of each lens and diaphragm are louder in the still-image priority moving-image mode than in the moving-image mode. These loud vibration and noise are stored as the operating noises in moving image data. These operating noises are not objective sounds but unwanted noises. Operating noises are louder in the still-image priority moving-image mode than in the moving-image mode, and consequently may decrease the sound quality of moving images. Therefore, in the still-image priority moving-image mode, it is preferable to reduce noise of sound signals using a band-limiting filter. More specifically, the band-limiting filter used to filter sound signals by digital video/audio processor 120 should preferably have an inverted U-curved frequency response suppressed in the high- and low-frequency ranges.

Figure 4:
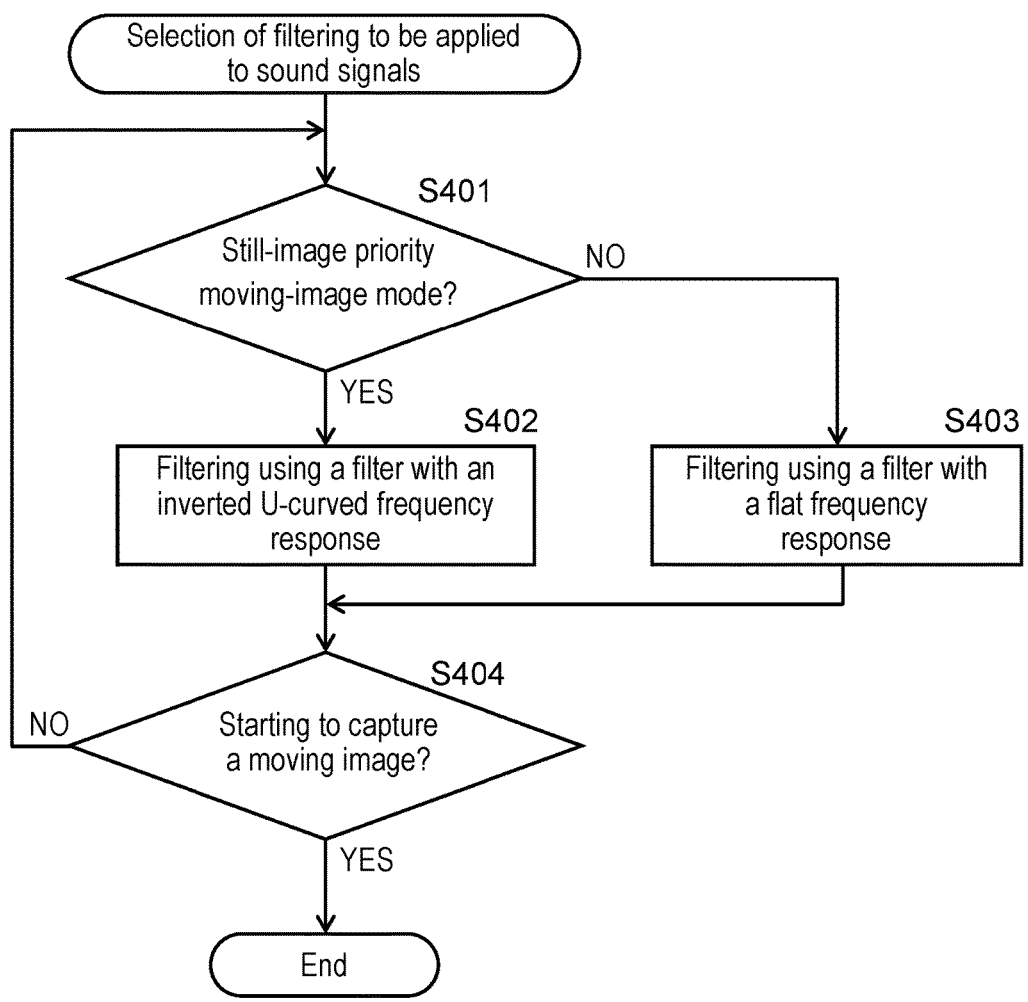
FIG. 4 is a flowchart of the selection of a filtering process to be applied to sound signals in the digital camera according to the first exemplary embodiment.

FIG. 4 is a flowchart of the selection of a filtering process to be applied to sound signals in digital camera 100. The selection of a filtering process will be described with reference to FIG. 4. In Step S401 of the selection of a filtering process to be applied to sound signals, if the user operates operation unit 180 of digital camera 100 and selects the still-image priority moving-image mode, the process goes to Step S402. If the user does not select this mode in step S401, the process goes to Step S403. In Step S402, controller 130 controls digital video/audio processor 120 so that the filter for filtering sound signals has an inverted U-curved frequency response suppressed in the high- and low-frequency ranges, and the process goes to Step S404. On the other hand, in Step S403, controller 130 controls digital video/audio processor 120 so that the filter has an approximately flat frequency response, and the process goes to Step S404. In Step S404, if the user operates operation unit 180 to start to capture a moving image, the selection of the filtering process is terminated. Otherwise, the process returns to Step S401.

When the still-image priority moving-image mode is selected to capture a moving image, the filter having an inverted U-curved frequency response suppressed in the high- and low-frequency ranges is used for filtering sound signals. As a result, even if sound signals of a moving image contain operating noise caused by the driving of each lens and diaphragm, the noise can be reduced to make the objective sounds in the sound signals highly audible. Consequently, when a moving image is captured under photographic conditions in which an image can be extracted from the moving image and used as a still image, even if the sound signals of the moving image contain the operating noise of a component of the imaging device, the noise can be reduced.

The directivity synthesis will now be described as follows. Digital video/audio processor 120 performs directivity synthesis on the sound signals from microphone unit 111 by arithmetic operations.

In general, when two microphones arranged side by side are used for recording, while a moving image is being captured, sound signals are recorded by a stereo microphone with left channel (Lch) and right channel (Rch). Furthermore, in order to produce realistic sounds, the Lch signal is left directional, whereas the Rch signal is right directional. With this structure, during playback, sound from the left is clearly audible on the left channel and sound from the right is clearly audible on the right channel, thereby producing realistic sounds. Controlling directivity in this manner is hereinafter referred to as stereo process. On the other hand, controlling directivity so that the Lch and the Rch are fed with the same signal is hereinafter referred to as mono process. The mono process produces less realistic sounds, but makes objective sounds more audible (increase the signal-to-noise ratio) as will be described later.

Figure 5A:
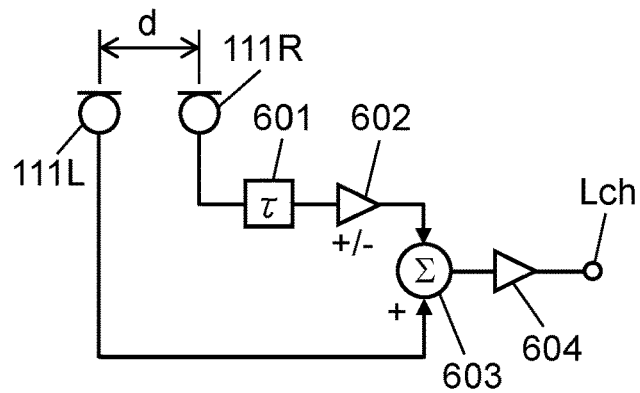
FIG. 5A shows an example of directivity synthesis to be applied to sound signals in the digital camera according to the first exemplary embodiment.
Figure 5B:
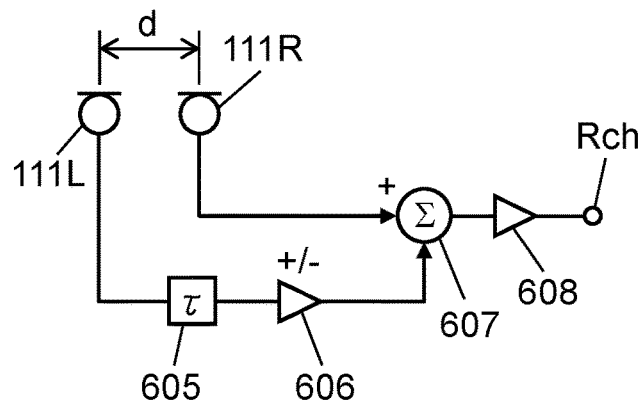
FIG. 5B shows another example of the directivity synthesis to be applied to sound signals in the digital camera according to the first exemplary embodiment.
Figure 5C:
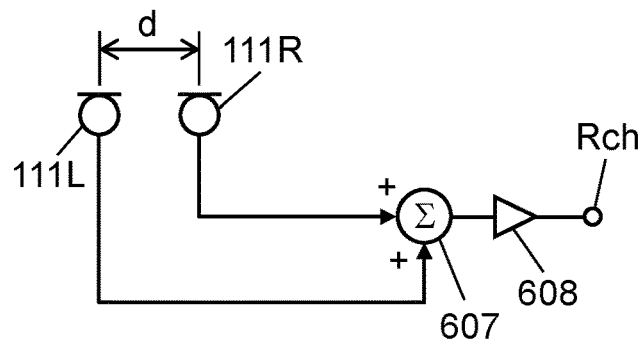
FIG. 5C shows an example of a mono process to be applied to sound signals in the digital camera according to the first exemplary embodiment.

FIGS. 5A to 5C show examples of directivity synthesis to be applied to sound signals in digital camera 100.

FIG. 5A shows an example of directivity synthesis to obtain an output for the Lch. Sound waves coming from the right of digital camera 100 reach microphone 111R first and then reaches microphone 111L in time T. The time ti can be expressed by formula (1) shown below where d is the distance between microphones 111R and 111L, and c is the speed of the sound waves:

$$\pi = d/c \qquad \text{formula (1)}$$

First, the stereo process will now be described.

If the output of right microphone 111R is delayed by time τ and the resulting value is subtracted from the output of left microphone 111L, then the output of the sound waves coming from the right is compensated. Delay unit 601 gives the delay of time τ to the output of microphone 111R. Sign unit 602 multiplies the output of delay unit 601 by a negative sign (−). In other words, sign unit 602 outputs an inverted signal of its input. Adder 603 adds the output of sign unit 602 to the output of microphone 111L, and outputs the addition result. In short, the output of adder 603 is equal to the value obtained by subtracting the output of delay unit 601 from the output of microphone 111L. Multiplier 604 multiplies the output of adder 603 by 1 so as to obtain an output for the Lch. This process produces an output for the Lch, which is poorly sensitive to sound waves coming from the right.

FIG. 5B shows directivity synthesis to obtain an output for the Rch. The process shown in FIG. 5B is identical to that shown in FIG. 5A except that the right and left are reversed. More specifically, delay unit 605 gives the delay of time τ to the output of microphone 111L. Sign unit 606 multiplies the output of delay unit 605 by a negative sign (−). In other words, sign unit 606 outputs an inverted signal of its input. Adder 607 adds the output of sign unit 606 to the output of microphone 111R, and outputs the addition result. In short, the output of adder 607 is equal to the value obtained by subtracting the output of delay unit 605 from the output of microphone 111R. Multiplier 608 multiplies the output of adder 607 by 1 so as to obtain an output for the Rch. This process produces an output for the Rch, which is poorly sensitive to sound waves coming from the left.

The outputs for the Lch and Rch obtained by the stereo process produce realistic sounds because of the bidirectional directivity as described above. However, the output signals of adders 603 and 607 have small amplitudes because the signals are subtracted. This makes the outputs for the Lch and Rch have a low signal-to-noise ratio, possibly causing objective sound to be less audible.

The mono process will be described as follows.

FIG. 5C shows an example of a mono process to be applied to sound signals. Adder 607 adds the outputs of microphones 111R and 111L, and outputs the addition result to multiplier 608. Multiplier 608 multiplies the output of adder 607 by an appropriate value so as to obtain an output for the Rch. Multiplier 608 multiplies the output of adder 607 by, for example, 0.5 and outputs the multiplication result. As a result, the average between the outputs of microphones 111R and 111L is obtained as the output for the Rch. The value to be multiplied by multiplier 608 may be determined, for example, so that the output for the Rch is approximately equal to that in the stereo process. Although FIG. 5C shows synthesis to obtain an output for the Rch, an output for the Lch can be obtained by the same synthesis.

The synthesis of sound signals in the mono process shown in FIG. 5C can be achieved using the structure of the stereo process shown in FIGS. 5A and 5B.

In FIG. 5A, delay unit 601 gives a delay time of 0 to the output of microphone 111R. In short, delay unit 601 does not delay the signal. Sign unit 602 multiplies the output of delay unit 601 by a positive sign (+). In other words, sign unit 602 outputs the same signal as its input. Adder 603 adds the output of sign unit 602 to the output of microphone 111L, and outputs the addition result. In short, the output of adder 603 is equal to the sum of the outputs of microphones 111L and 111R. Multiplier 604 multiplies the output of adder 603 by 0.5 so as to obtain an output for the Lch. Thus, the obtained output for the Lch is the average value of the outputs of microphones 111L and 111R.

In FIG. 5B, delay unit 605 gives a delay time of 0 to the output of microphone 111L. In short, delay unit 605 does not delay the signal. Sign unit 606 multiplies the output of delay unit 605 by a positive sign (+). In other words, sign unit 606 outputs the same signal as its input. Adder 607 adds the output of sign unit 606 to the output of microphone 111R, and outputs the addition result. In short, the output of adder 607 is equal to the sum of the outputs of microphones 111L and 111R. Multiplier 608 multiplies the output of adder 607 by 0.5 so as to obtain an output for the Rch. Thus, the obtained output for the Rch is the average value of the outputs of microphones 111L and 111R.

As described above, the output for each of the Lch and Rch obtained by the mono process is an average value of the outputs of microphones 111L and 111R. The absence of directivity either to the right or to the left causes the sounds to be unrealistic. Meanwhile, the outputs of adders 603 and 607 are large because the signals of microphones 111L and 111R are added together. This makes the outputs for the Lch and Rch have a high signal-to-noise ratio. In short, the noise is relatively low in magnitude with respect to sound signals. Thus, performing directivity synthesis in a mono process reduces noise caused during the driving of each lens and diaphragm, thereby making objective sound more audible.

Figure 6:
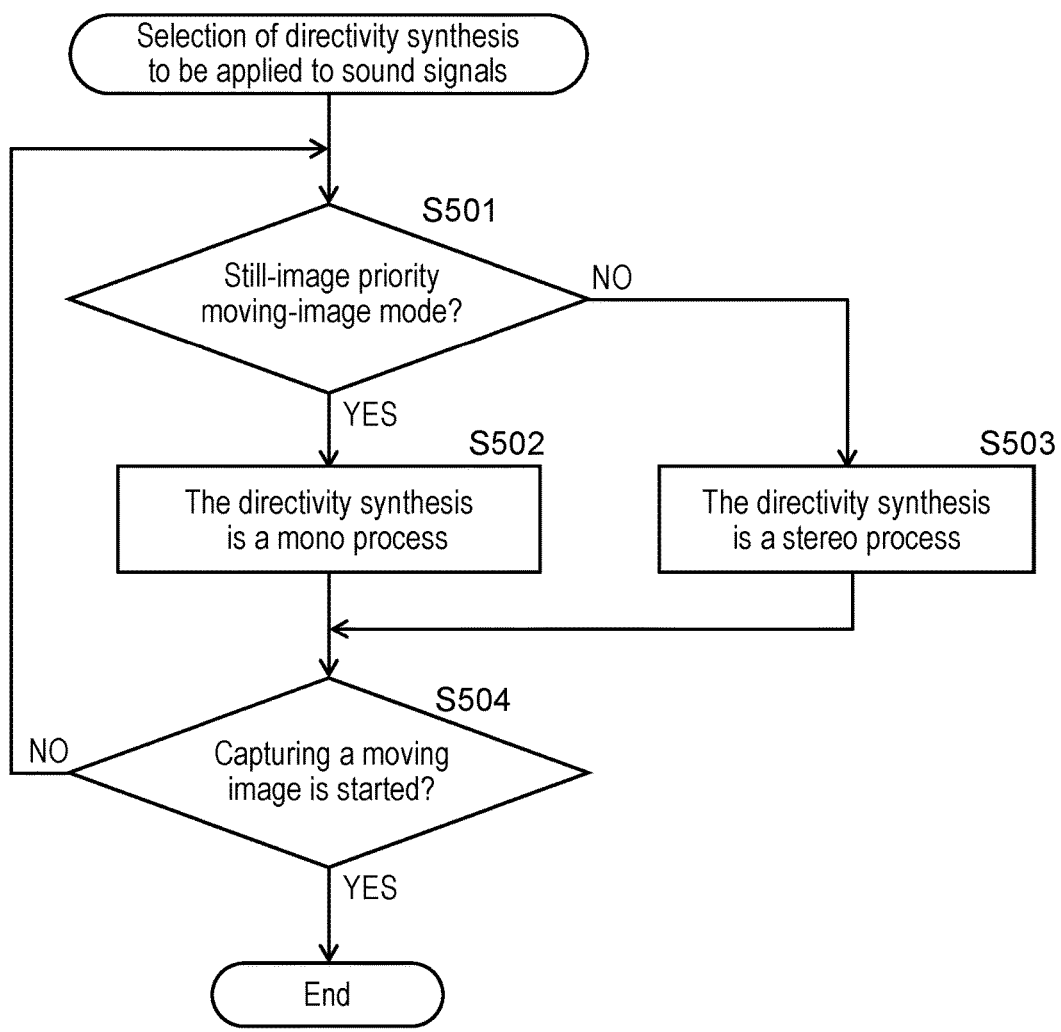
FIG. 6 is a flowchart of the selection of directivity synthesis to be applied to sound signals in the digital camera according to the first exemplary embodiment.

FIG. 6 is a flowchart of the selection of directivity synthesis to be applied to sound signals in digital camera 100. In Step S501, if the user operates operation unit 180 of digital camera 100 and selects the still-image priority moving-image mode, the process goes to Step S502. If the user does not select this mode in step S501, the process goes to Step S503. In Step S502, controller 130 controls digital video/audio processor 120 so that the directivity synthesis to be applied to sound signals is a mono process, and the process goes to Step S504. On the other hand, in Step S503, controller 130 controls digital video/audio processor 120 so that the directivity synthesis to be applied to sound signals is a stereo process, and the process goes to Step S504. In Step S504, if the user operates operation unit 180 to start to capture a moving image, the selection of the directivity synthesis is terminated. Otherwise, the process returns to Step S501.

When the still-image priority moving-image mode is selected to capture a moving image, the directivity synthesis to be applied to sound signals is a mono process. This makes the signal-to-noise ratio high so that objective sound is audible. More specifically, even if an sound signal of the moving image being captured contains operating noise caused during the driving of each lens and diaphragm, the operating noise can be reduced. Consequently, when a moving image is captured under photographic conditions in which an image can be extracted from the moving image and used as a still image, even if the sound signals of the moving image contain the operating noise of a component of the imaging device, the noise can be reduced.

Figure 7:
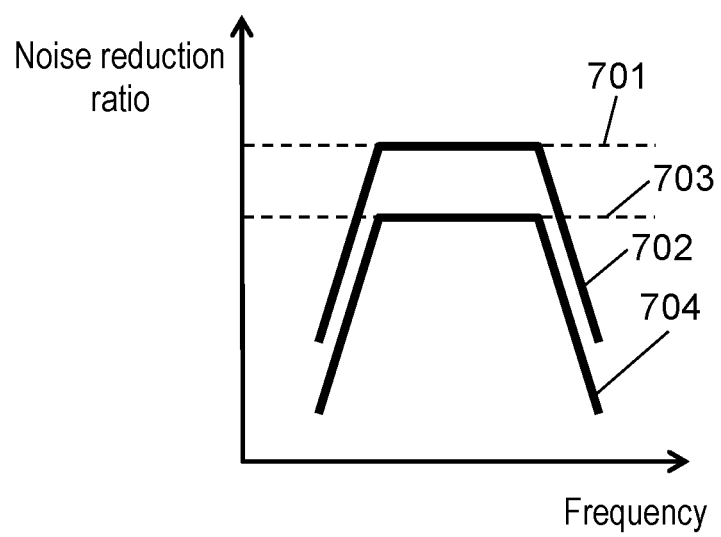
FIG. 7 is a graph showing noise reduction performed in the digital camera according to the first exemplary embodiment.

The noise reduction by filtering and directivity synthesis will now be described with reference to FIG. 7. Frequency response 701 represents the noise reduction ratio obtained when filtering is performed using a filter with a flat frequency response, and the directivity synthesis is a stereo process. Frequency response 702 represents the noise reduction ratio obtained when filtering is performed using a band-limiting filter, and the directivity synthesis is a stereo process. Frequency response 703 represents the noise reduction ratio obtained when filtering is performed using a filter with a flat frequency response, and the directivity synthesis is a mono process. Frequency response 704 represents the noise reduction ratio obtained when filtering is performed using a band-limiting filter, and the directivity synthesis is a mono process. In FIG. 7, the noise reduction characteristics are obtained when each of multipliers 604 and 608 is set to output a signal of the same magnitude regardless of whether the directivity synthesis is a mono process or a stereo process.

Frequency response 702 indicates that noise in the high- and low-frequency ranges is reduced as compared with frequency response 701. More specifically, out of the operating noise contained in the sound signals of a moving image, components in the high- and low-frequency ranges can be reduced by filtering using a band-limiting filter with an inverted U-curved frequency response. Frequency response 703 indicates that noise in a wider frequency range is reduced as compared with frequency response 701. In other words, directivity synthesis in a mono process can reduce the operating noise contained in the sound signals of a moving image in a wider frequency range. Frequency response 704 indicates that noise in the mid-frequency range, or the range of the band-limiting filter is reduced and that noise in the high- and low-frequency ranges is more highly reduced as compared with the frequency response 701. In short, a combination of filtering and directivity synthesis can reduce operating noise contained in the sound signals of a moving image throughout the entire frequency range.

In the still-image priority moving-image mode, the operating noise can be reduced efficiently throughout the entire frequency range by fitting both filtering and directivity synthesis to this mode. Thus, under photographic conditions in which each lens and diaphragm are driven fast, the operating noise can be reduced throughout the entire frequency range, so as to reduce unnaturalness caused by the operating noise.

Digital camera 100 is an example of the imaging device according to the present disclosure. Focus lens 310, zoom lens 312, and OIS lens 318 are examples of the movable lens of the present disclosure. CCD image sensor is an example of the image capture unit of the present disclosure. Controller 130 and lens controller 320 are examples of the control unit of the present disclosure. The still-image priority moving-image mode is an example of the first mode of the present disclosure. The moving-image mode is an example of the second mode of the present disclosure.

Other Exemplary Embodiments

The present disclosure is not limited to above exemplary embodiment, and can be various other exemplary embodiments. Other exemplary embodiments of the present disclosure will be described as follows.

In above exemplary embodiment, digital camera 100 is taken as an example of the imaging device equipped with a sound-collecting device. Alternatively, however, the imaging device can be any device capable of capturing a moving image (capable of recording sound), such as a video camera.

The functions and structure of digital video/audio processor 120 described in above exemplary embodiment may be partly included in controller 130, whereas those of controller 130 described in above exemplary embodiment may be partly included in digital video/audio processor 120.

In above exemplary embodiment, CCD image sensor 143 is taken as an example of the image capture unit. Alternatively, however, other image pickup devices such as CMOS image sensors and NMOS image sensors are applicable to the present disclosure.

The present disclosure is applicable to, for example, digital cameras and movie cameras.

What is claimed is:

1. An imaging device comprising:
   an optical system including a movable lens;
   an image capture unit configured to capture a subject image through the optical system;
   a sound-collecting microphone; and
   a control unit configured to control the optical system and the image capture unit and to receive an sound signal from the microphone,
   wherein
   the imaging device has a first mode and a second mode as moving-image shooting modes,
   the control unit makes the movable lens move faster in the first mode than in the second mode when a moving image is captured, and
   the control unit filters the sound signal with a narrower-band filter in the first mode than in the second mode.

2. The imaging device according to claim 1, wherein in the first mode, the control unit makes the sound signal subjected to directivity synthesis in a mono process.

3. An imaging device comprising:
   an optical system including a movable lens;
   an image capture unit configured to capture a subject image through the optical system;
   a sound-collecting microphone; and
   a control unit configured to control the optical system and the image capture unit and to receive an sound signal from the microphone,
   wherein
   the imaging device has a first mode and a second mode as moving-image shooting modes,
   the control unit makes the movable lens move faster in the first mode than in the second mode when a moving image is captured, and
   in the first mode, the control unit makes the sound signal subjected to directivity synthesis in a mono process.

* * * * *